C. B. MOORE.
VEHICLE SEAT.
APPLICATION FILED MAR. 2, 1910.
972,393.
Patented Oct. 11, 1910.
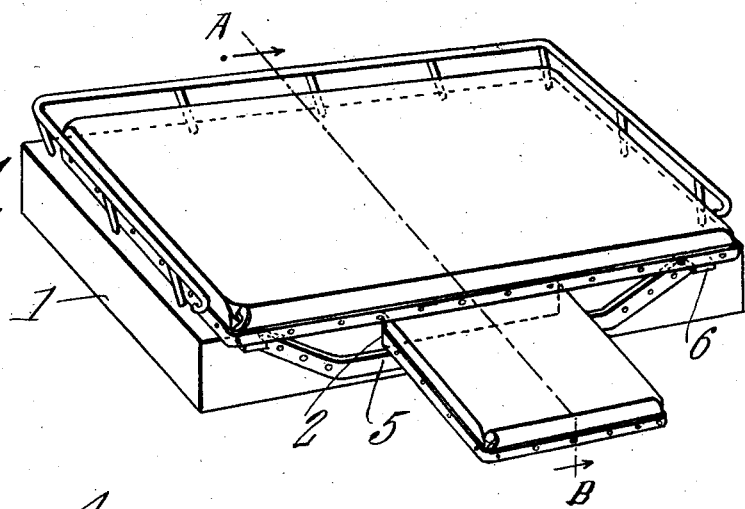
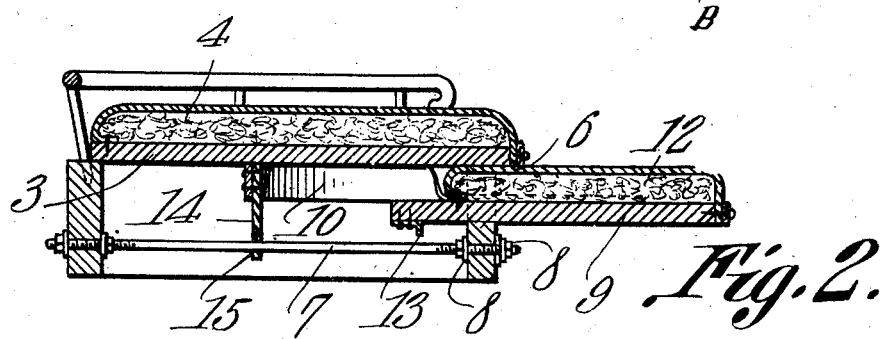
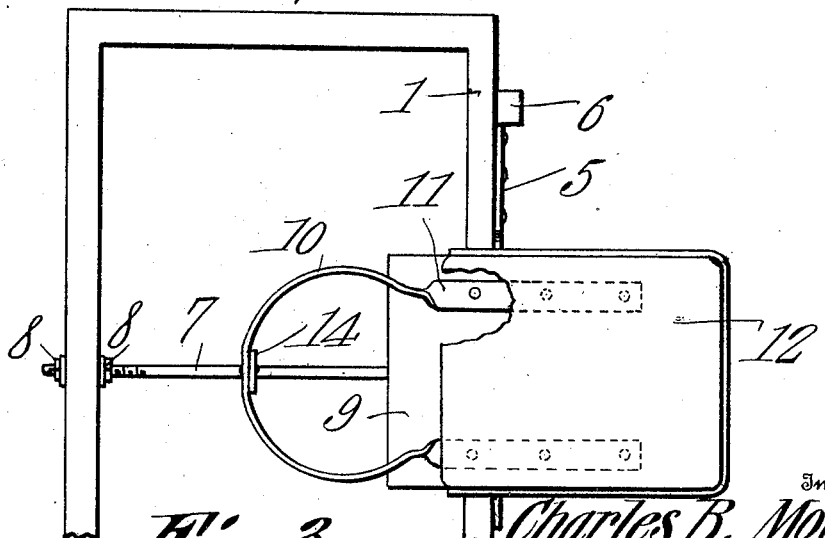
Inventor
Charles B. Moore.
By CASnow & Co.
Attorneys
Witnesses

UNITED STATES PATENT OFFICE.

CHARLES B. MOORE, OF ROCHESTER, INDIANA.

VEHICLE-SEAT.

972,393.  Specification of Letters Patent.  Patented Oct. 11, 1910.

Application filed March 2, 1910. Serial No. 546,843.

*To all whom it may concern:*

Be it known that I, CHARLES B. MOORE, a citizen of the United States, residing at Rochester, in the county of Fulton and State of Indiana, have invented a new and useful Vehicle-Seat, of which the following is a specification.

This invention relates to vehicle seats and more particularly to an extension seat for the accommodation of a person in front of and between the occupants of the main seat. The invention is more particularly designed as an improvement upon the structure disclosed in Patent No. 656,775 issued to me on August 28, 1900.

One of the objects of the invention is to provide an extension seat having a cushion forming an integral part thereof, the said cushion and its support being shiftable into the main seat when not in use and being arranged to be readily brought into position in front of the main seat when it is desired to use the same.

A further object is to provide improved means for guiding the extension seat during the movement thereof, said guiding means also serving to properly support the extension seat when in its operative position.

A further object is to provide a structure of this type which is simple and durable in construction and comparatively cheap to manufacture and which does not mar the appearance of the main seat.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a perspective view of a seat having the present improvements combined therewith. Fig. 2 is a section on line A—B Fig. 1. Fig. 3 is a top plan view of the seat with the cushion and top of the main seat removed, one end portion of said main seat being broken away.

Referring to the figures by characters of reference 1 designates the frame of the main seat, the same being of any preferred construction and provided in the front thereof at its center with a slot or elongated recess 2 the depth of which is substantially equal to the extreme thickness of the extension seat hereinafter described.

The frame 1 is provided with the usual cover 3 on which is fastened a cushion 4, this cover 3 preferably projecting a short distance beyond the front of the frame. A reinforcing strap 5 is secured to the front of the frame 1 and extends under and close to the slot or recess 2, the end portions of this strap being inclined upwardly and terminating in forwardly extending ears 6 which are secured in any suitable manner to the projecting front edge portion of the top or cover 3.

A guide rod 7 extends through the centers of the front and rear portions of the frame 1, the front end of the rod being extended through an opening in the middle portion of the strap 5. Nuts 8 or the like are adjustably mounted on the end portions of the rod 7, these nuts bearing upon the inner and outer faces of the front and rear portions of the frame 1 so as to positively hold the rod 7 against longitudinal displacement within the frame and to also hold said frame against springing either inwardly or outwardly.

A slide 9 is mounted upon the bottom wall of the slot or recess 2 and has a bowed extension 10 projecting beyond the inner end thereof, the terminals of said extension forming parallel straps 11 which are secured flat upon the slide 9 adjacent the side edges thereof. A cushion 12 is secured upon the upper face of the slide 9 and is designed to fit snugly within the opening 2, this cushion being of such length as to partly extend under the overhanging or forwardly projecting portion of the top or cover 3 when the slide 9 is drawn outward to its greatest extent. This outward movement of the slide is limited by a stop bracket 13 which is fastened to the inner end thereof and hangs downwardly from the lower surface of the slide.

A guide plate 14 is secured to the intermediate portion of the extension 10 and has an aperture 15 through which the rod 7 extends. This plate or bracket 14 serves to hold the extension 10 and the slide 9 against up and down movement and coöperates with the walls of the opening 2 to hold the slide fixedly in any position to which it may be moved.

In using the seat herein described the same is placed in position as usual and when it is desired to utilize the auxiliary or extension seat, slide 9 is pulled outwardly. The plate or bracket 14 will therefore slide along the rod 7 until the stop bracket 13 comes against the front portion of the frame 1. The cushion 12 will therefore be held projected beyond the front of the main seat or cushion 4 and downward tilting of the front portion of this auxiliary seat will be prevented in view of the fact that the extension 10 pulls upwardly on the fixed rod 7 and also bears upwardly against the top or cover 3. When the seat is not in use it can be pushed back into the frame 1.

It will be seen that the seat which has been described is very simple and durable in construction and cheap to manufacture and, by reason of the fact that the extension 10 bears firmly against the top 3 and the plate 4 is in constant engagement with the rod 7, there is no danger of the auxiliary seat sagging under any ordinary weight placed thereon.

It is to be understood that various changes may be made in the construction and arrangement of the parts without departing from the spirit or sacrificing any of the advantages of the invention as defined in the appended claims.

What is claimed is:—

1. The combination with a main seat structure including a frame and a top thereon, said frame having an opening in one wall, of a slide mounted within said opening, an extension upon the slide and normally bearing upwardly against the top of the main seat structure, a guide, and means upon the extension for slidably engaging the guide.

2. The combination with a main seat structure including a frame having an opening in one wall thereof, and a top upon the frame, of a slide movably mounted within the opening, a cushion on the slide and movable therewith into the opening, a tie device connecting opposed portions of the frame to hold them against relative displacement, said device constituting a guide, an extension upon the slide and normally bearing upward against the top of the structure, and means upon said extension for slidably engaging the guide.

3. The combination with a main seat structure including a frame and a top fixedly connected to the frame, said frame having an opening in one wall, of a slide mounted within said opening, a cushion carried thereby, an extension upon the slide and preferably housed within the main seat structure, said extension normally bearing upwardly against the top of said structure to hold the slide against sagging when extended through the opening, a tie rod connecting opposite walls of the frame, and means upon the extension for slidably engaging the rod, said rod constituting a guide.

In testimony that I claim the foregoing as my own, I have hereto affixed my signature in the presence of two witnesses.

CHARLES B. MOORE.

Witnesses:
P. M. BUCHANAN,
EUNICE MILLER.